Nov. 5, 1957 L. J. KMIECIK 2,812,101
PIPE PLUG
Filed March 1, 1956
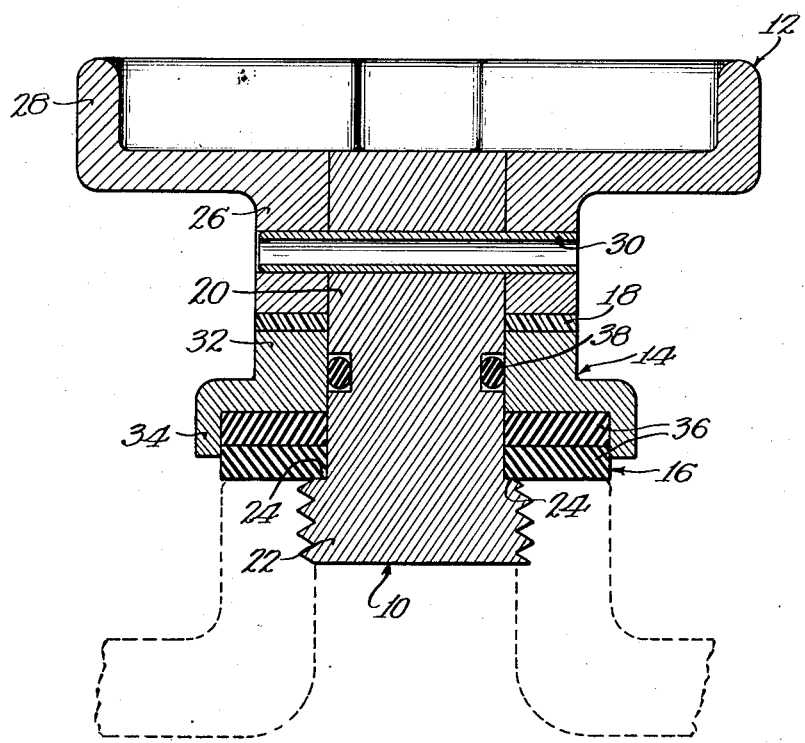
INVENTOR.
Leopold J. Kmiecik
BY
Brown, Jackson, Boettcher & Dienner
Attys.

United States Patent Office 2,812,101
Patented Nov. 5, 1957

2,812,101

PIPE PLUG

Leopold J. Kmiecik, Chicago, Ill., assignor to McDonnell & Miller, Inc., Chicago, Ill., a corporation of Delaware Application March 1, 1956, Serial No. 568,901

1 Claim. (Cl. 220—39)

The present invention relates to improved means for sealing openings in pipes, tanks, pressure vessels and the like, and particularly, to improved pipe plug means.

Pipe plugs are employed for temporarily or permanently closing unused openings in pipe lines, liquid storage tanks, pressure vessels and the like. One use of pipe plugs to which the present invention has particular but not exclusive relation is the temporary sealing of threaded openings in liquid storage tanks and pressure vessels undergoing leak test. During the test, all openings in the tank or vessel except the inlet are temporarily sealed by pipe plugs threaded into the openings. To secure an effective seal, it has been essential with conventional plugs to thread the same so tightly into the opening at the mating threads on the two members engage in sealed relationship, which obviously necessitates use of a wrench and expenditure of considerable time and labor both in inserting and removing the plugs.

It is the object of the present invention to provide improved plug means quickly threaded by hand onto and off of tanks, pipes and the like and including sealing means engageable with the means defining the opening to effect the requisite seal without the use of wrenches and in a minimum time.

Another object of the invention is the provision of improved pipe plug means adapted to be used over and over again for the purposes stated without appreciable wear.

It is also an object of the invention to provide improved means of the character described including resilient sealing means engageable with the end surface of the means defining the threaded opening, and actuating means engageable with the thread of said means for exerting a compressive force only on the sealing means to tighten the same onto said end surface without rotation, thus to prolong seal life and facilitate attainment of sealed engagement by hand without need for wrenches.

A further and more specific object of the invention is the provision of improved means of the character described including a first member having a threaded portion at one end and a handle at the other end to facilitate threading of the member onto a tank or the like, a second member mounted for rotation on the first member and held thereon against longitudinal movement, a seal carried by the second member for engagement with the means defining the opening to be closed, and anti-friction means between the two members to prevent transmission of torque from the first member to the second member and said seal.

A still further object of the invention is the provision of means as set forth wherein said anti-friction means comprises a disc formed of a fluorinated polymer.

Other objects and advantages of the invention will become apparent in the following detailed description of a preferred embodiment of the invention.

Now, in order to acquaint those skilled in the art with the improved pipe plug means of my invention, I shall describe, in connection with the accompanying drawing, a preferred embodiment of said means and a preferred manner of making the same.

Referring to the drawing, I have shown my improved pipe plug means in vertical cross section as being comprised, simply, of a plug shaft 10, a handle 12 fixed to the shaft 10, a retainer 14 journaled on the shaft, sealing means 16 carried by the retainer, and anti-friction means 18 between the retainer and the shaft handle.

The shaft 10 is preferably cylindrical throughout and includes a stem portion 20 and an enlarged, externally threaded head 22, a radial shoulder 24 being defined between the head and stem. The handle 12 is of any known construction and includes a hub 26 having a bore complemental to the stem 20, and radially extending hand grip portions 28. The hub 26 is mounted on the stem 20 in spaced relation to the shoulder 24, and to secure the same in position, a lock pin 30 extends diametrically through the hub and stem.

The retainer 14 is cylindrical and includes a body portion 32 of a length less than the spacing between the hub 26 and shoulder 24 which is rotatably mounted on the stem in said space. At its lower end, the retainer is provided with an enlarged, counterbored extension 34 defining a seat for the sealing means 16. The sealing means preferably comprises one or more resilient sealing discs 36, suitably formed of rubber or the like, of a combined thickness greater than the depth of the counterbore in the extension 34 so that the seal extends beyond the lower end of the retainer. The discs fit frictionally within the extension 34 and are retained therein by the shoulder 24 on the plug shaft, but do not have appreciable frictional engagement with the shaft 10 or the shoulder 24. An additional seal is provided between the shaft and the retainer in the form of a resilient O-ring 38 positioned within a circumferential groove in the stem 20 and sealing lightly on the inner surface of the retainer body 32.

As thus mounted, the retainer 14 and sealing means 16 are rotatable with respect to the plug shaft 10 so that the head 22 of the shaft may be screwed into a threaded opening without rotating the sealing means. To effect the seal, the sealing means must be maintained against appreciable axial movement, and for this purpose, the retainer and the sealing discs are confined between the shaft shoulder 24 and the handle hub 26. In this position, if the hub were to bear directly on the retainer, rotary movement imparted to the handle would be transmitted to the retainer to rotate the same and defeat the purpose of the defined mounting.

To overcome the stated objection, I provide the anti-friction means 18 between the adjacent ends of the handle hub 26 and the body 32 of the retainer 14. The anti-friction means 18 may comprise an end-thrust bearing or other known anti-friction means. However, it is an important feature of the invention to constitute said means as a flat annular disc formed of a material having a low coefficient of friction. I have found a fluorinated polymer, polymerized tetrafluoroethylene, to be particularly advantageous. Polytetrafluoroethylene, commercially available under the tradename "Teflon," has a remarkably low coefficient of friction, exhibiting a slippery wax or soap-like feel to human touch. It is highly resistant to chemical action and is readily used throughout a temperature range of minus 150° to plus 575° F. The material is exceedingly tough yet is readily machined by conventional wood and metal-working tools. Being available in tubular stock, this plastic material particularly lends itself to the convenient and economical formation of the annular disc or washer required in the preferred embodiment of my invention.

To assemble the plug, the sealing discs 36 are inserted in the counterbored extension 34 of the retainer and the O-ring 38 is fitted into the groove in the stem 20 of the plug shaft. The stem of the shaft is then passed through the retainer body 32, and the anti-friction means or polytetrafluoroethylene disc 18 is rotatably mounted on the stem on top of the retainer. The handle 12 is then applied to the stem 20 of the shaft and fixed thereto by the pin 30. In the assembly, the disc 18 is of a thickness to confine the sealing discs and retainer against appreciable axial or longitudinal movement between the hub 26 and the shoulder 24.

In the drawing, I have shown in dotted lines a fragmentary representation of an opening in a pipe, liquid storage tank, pressure vessel, or the like to which my improved pipe plug means is applicable, the opening as is conventional having an internal thread which is complemented by the thread on the head 22 of the plug. In use, the head 22 of the plug shaft 10 is inserted into the opening and the operator then turns the handle 12 to thread the shaft into the opening. When the lower sealing disc 36 engages the outer surface of the vessel or the boss surrounding the opening, the high coefficient of friction of the seal retains the sealing discs and the retainer 14 against rotation. At the same time, the anti-friction means or polytetrafluoroethylene disc 18, due to its low coefficient of friction, accommodates rotation of the handle and shaft with respect of the retainer and seal to facilitate further threading of the shaft into the opening, whereupon the handle hub 26 exerts a compressive force against the seal without application of torque to force the lower disc into sealed engagement with portions of the vessel surrounding the opening. Due to the absence of torsional influence, seal life is very substantially extended and an effective seal is obtained without the expenditure of appreciable energy. When the vessel is placed under pressure, the seals 36 prevent escape of fluid around the opening and the seal 38 prevents escape of fluid between the plug shaft and retainer, thus fully to seal the opening.

From the foregoing, it is seen that the present invention affords means facilitating the quick and convenient plugging of openings in pipes, tanks, and the like, which means does not require the use of wrenches or other tools, and does not require the expenditure of appreciable time or energy in inserting or removing the same. Accordingly, it has been shown that all of the objects and advantages of the invention are readily obtained in a practical and economical manner.

In the art specifically referred to hereinbefore, the openings to be closed are internally threaded and the preferred embodiment of the invention therefore deals with that type of opening. To close an externally threaded opening, only a general reversal of the relationship shown would be required, the handle then being attached to the member 14 which would have an internal thread, the member 10 carrying the sealing means, and the anti-friction means being provided between the members 10 and 12.

While I have described and shown what I regard to be the preferred embodiment of my invention, it will be appreciated that various changes, rearrangements and modifications may be made therein without departing from the scope of the invention, as defined by the appended claim.

I claim:

Pipe plug means comprising a cylindrical plug shaft having a stem and an enlarged externally threaded head at one end thereof defining a shoulder between the stem and head, a handle having a hub fixed to said stem in spaced relation to said shoulder, a cylindrical retainer having a body of a length less than the space between said hub and shoulder rotatably mounted on said stem in said space, an O-ring seal between said stem and the body of said retainer, said retainer at the end thereof adjacent said shoulder having an enlarged counterbored extension, a plurality of resilient sealing discs fitted in said counterbored extension and retained therein by said shoulder, said discs being rotatable with respect to said shaft, and an annular disc of polytetrafluoroethylene rotatably mounted on said stem between said hub and said retainer, the last-named disc being of a thickness to confine said retainer and said sealing discs against appreciable axial movement between said hub and said shoulder.

References Cited in the file of this patent
UNITED STATES PATENTS

| | | |
|---|---|---|
| 1,038,026 | Thomas | Sept. 10, 1912 |
| 2,441,514 | Schorr | May 11, 1948 |